Patented July 9, 1940

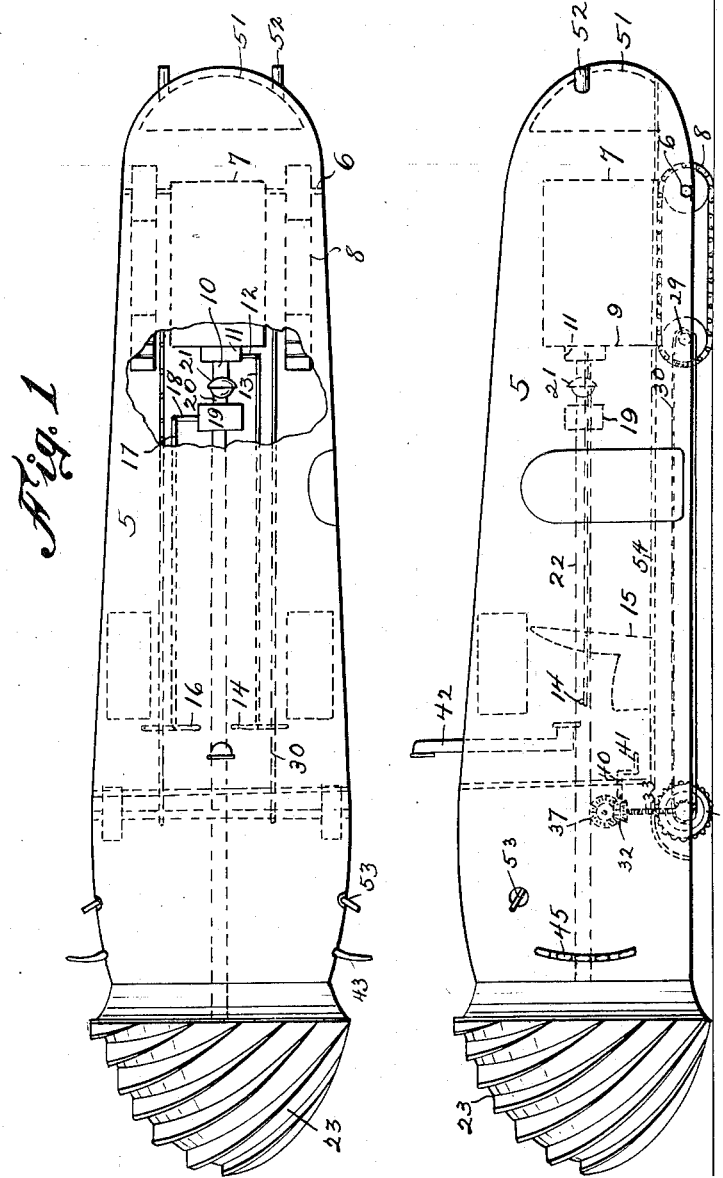

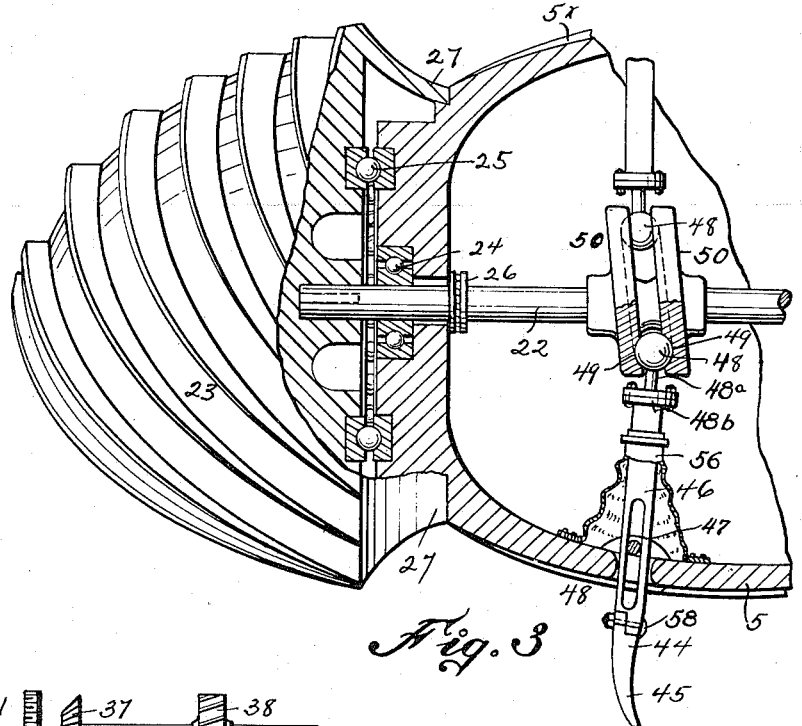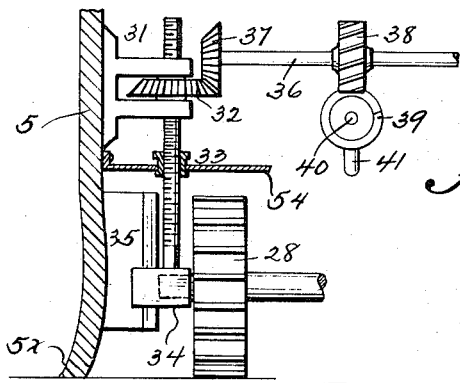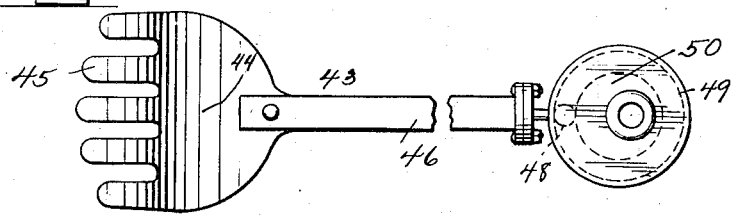

2,207,536

UNITED STATES PATENT OFFICE 2,207,536

SUBTERRANEAN WAR MACHINE

Gratz D. Dunkum, Alexandria, Va.

Application July 13, 1939, Serial No. 284,369

11 Claims. (Cl. 262—1)

This invention relates to subterranean war machines, and it has for its object to provide a mobile vehicle of the so-called "tank" type, provided with weapons of offense, such as poison gas, machine guns, and the like, and also provided with means by which it may be caused to burrow into the ground for purposes of concealment or for the purpose of getting beyond an enemy's lines without being seen.

Further objects and advantages of the invention will be set forth in the detailed description which follows.

In the accompanying drawings:

Figure 1 is a plan view of a machine constructed in accordance with the invention;

Fig. 2 is a side elevation thereof;

Fig. 3 is an enlarged view partly in side elevation and partly in section illustrating the boring head of the machine;

Fig. 4 is a detail view of mechanism for raising and lowering the forward portion of the casing and boring head with respect to the line of travel of the ground wheels; and Fig. 5 is a detail view of one of the digger arms, hereinafter described.

Like numerals designate corresponding parts throughout the several figures of the drawings.

The housing shell 5 of the machine will preferably be made of armor plate. The rear end of this shell is pivotally supported upon the rear axle 6 of a caterpillar tractor 7, the tread of which is indicated at 8, and the engine of which is indicated at 9.

The main shaft 10 of the engine drives through any conventional type of clutch 11 to the caterpillar tread 8 in the usual way, and the operating lever 12 of this clutch is connected by a link 13 with an operating handle 14, disposed adjacent the driver's seat 15. A second operating handle 16 is connected by link 17 with the operating lever 18 of a second clutch 19.

The input shaft 20 of this clutch 19 is connected by a universal joint 21 with main shaft 10, and the output shaft 22 constitutes the drive shaft for an auger or reamer-like head 23, which constitutes the nose of the machine. Anti-friction bearings 24 and thrust bearings 25 and 26 provide an anti-friction mounting for the head 23. An annular apron 27, carried by the head, prevents the entry of the dislodged dirt into the bearings 24 and 25.

The forward part of the shell 5 is supported upon spurred ground wheels 28, and these wheels are preferably, though not necessarily, driven from the front axle 29 of the caterpillar by means of sprocket chains 30. The support for the shell 5, shaft 22 and boring head 23 upon the ground wheels 28, includes an adjusting structure that is illustrated in Fig. 4, it being understood that the structure there illustrated is duplicated at the opposite side of the machine.

By referring to Fig. 4, it will be seen that the shell 5 carries a bifurcated bracket 31, between the arms of which a bevel gear 32 is mounted. This bevel gear engages a threaded rod 33 in such manner that when the gear 32 is turned, it travels upwardly or downwardly upon rod 33, according to the direction of rotation of the gear. The lower end of the threaded rod 33 is rigidly fixed to a block 34, and this block has slidable engagement with ways 35, that are carried by shell 5.

A transverse shaft 36 carries at its ends bevel pinions 37 (only one of which is shown), and these pinions serve, when shaft 36 is rotated, to impart the necessary rotation to the bevel gears 32 at the opposite sides of the machine. Shaft 36 carries a worm wheel 38, that is turned by a worm 39. The shaft 40 of this worm constitutes an extension of a crank handle 41, disposed adjacent the driver's seat 15.

Thus, when the driver operates handle 41 to rotate worm 39, shell 5 will be lifted or lowered with respect to ground wheels 8. This in turn will tip shaft 22 and auger 23 upwardly or downwardly above or below the horizontal, to cause the machine to travel out of the ground or into the ground as the case may be.

It is not intended that this machine shall burrow deeply into the earth, because there is no necessity for it to do so, and when operating in soft soil just below the surface, much as a mole travels in the garden, a periscope 42 provides means by which the operator may see where he is going and observe surrounding conditions.

To aid in the forward travel of the machine and also to aid in throwing the loosened dirt rearwardly, and to prevent the dirt from impacting around the machine, I preferably provide a pair of digger flippers 43, illustrated in Figs. 3 and 5. These flippers comprise the enlarged outer portions 44, having the stout digging fingers 45. The shanks 46 are slotted at 47 to slidably engage pins 48 that are carried by shell 5. The inner ends of the shanks 46 carry balls 48, which engage in annular grooves 49, formed in the confronting faces of cams 50.

These cams are eccentrically disposed, diametrically considered, upon and with respect to shaft 22. In addition, they are set at an inclination or pitch with respect to said shaft. The result is that they impart two movements to the diggers; one an in and out movement due to the diametric eccentricity of the cams, and the other a fore and aft movement due to the pitch of said cams.

Thus the lower digger in Fig. 3 has been drawn inwardly and its fingers 45 have been moved forwardly by the cams, while the upper digger has been thrust outwardly and has had its outer end moved rearwardly by the cams. The rearward movement of the fingers occurs as the diggers are thrust outwardly, and thus the action is in the nature of a clawing action, which not only aids in the forward movement of the machine into the earth, but rakes the dirt rapidly rearwardly.

Any suitable type of artillery or other offensive agency commonly employed in war tanks may be mounted within the shell 5, and to indicate that such is the case, I have shown a poison gas tank at 51, adapted to discharge lethal gases through pipe 52. I have also indicated machine guns or light artillery at 53. While I have indicated only a driver's seat, it is to be understood that additional seats may be provided for additional personnel to aid in the operation of the offensive weapons or for observation.

A machine of this character will not only be able to travel through the ground in suitable soil but can quickly conceal itself by burrowing into a bank when occasion demands. When used to travel through the ground, it provides means for advancing offensive units into enemy territory for the purpose of destroying bridges, blowing up ammunition dumps, dominating strategic points, etc. When employed for the latter purpose, it is possible for a few men to hold up the advance of large forces.

It will be understood that many changes will readily suggest themselves to the skilled engineer. The accompanying drawings are intended to be merely explanatory of the general nature of the machine. As far as I am aware, I am the first to provide a device of this character, carrying lethal weapons, housing personnel for the operation of the same, capable of underground travel, and capable of having its direction of travel, either upwardly or downwardly, controlled from within.

Further, its direction of travel may be varied horizontally by proper manipulation of the tractor treads, it being common practice to cause these treads to have an unequal rate of travel to aid in guiding the tractor.

It is common practice to construct so-called amphibian machines; that is, those adapted to travel partly on land and partly in the water. Such machines have been provided with ground wheels and boat-like bodies, with engines for operating the ground wheels from within the relatively water tight, boat-like bodies.

In like manner, I contemplate the provision of means for preventing the entry of water to the interior of this machine if marshy ground should be encountered. To that end, I have provided the web-like bottom 54, through which the rods 33 extend and within which they may have a relatively water tight sliding fit by means of suitable stuffing boxes, conventionally illustrated at 55.

Further, the engine 9 may be located above this web or bottom 54, and only the tractor treads be below this web. I also contemplate providing means for preventing the entry of water past the shanks 46 of the diggers, and to this end, I secure to said shanks bellows-like members 56, secured at their inner portions to the shanks 46 and at their outer portions to the body 5 at 57.

The ball-carrying stems 48ª (see Fig. 3) are secured to the shanks 46 by means of flanges 48ᵇ, so that when the machine is traveling above the ground, the in and out movement of the digger arms may be stopped. In addition, I make the diggers proper, 44, separable from the shanks 46 by the use of bolts 58.

With the enlarged portions of these diggers removed by the removal of these bolts, it is possible to draw the shanks 46 inwardly to the extent of inward movement of the waterproof bellows members 56, and at this time, no portions of these shanks will be visible beyond the sides of the machine.

By referring to Fig. 4 it will be seen that the lower edges of the sides of the body 5 are flared outwardly to plough-like formation, as indicated at $5^x$, with their lower corners relatively sharp. When so constructed, these body sides act as scraper elements, much as the scraper blade of a road working machine scrapes the earth to a plane surface, and these out-turned edges have been indicated in Figs. 3 and 4.

The invention is not restricted to having the sides brought down to form the scraper blades at $5^x$. The body may, if desired, be of the general circumferential contour of the auger head 23.

While this machine has its principal utility as an engine of war, I wish it to be understood that it may be used for tunneling, or for subway excavation in general, and that my invention contemplates such use of the machine.

It is common practice in tank constructions to provide shutters to cover the gun ports, and I contemplate the use of these well-known devices for covering the gun ports or any windows which may be employed. Further, it is common construction in submarine boats and the like to employ periscopes of telescopic construction which may be projected or retracted at will, and I contemplate the use of any of these well-known arrangements in the place of the conventionally illustrated periscope of the present drawings.

It is also within the scope of the use of this machine to equip it with suitable radio apparatus and remote control devices in a way common to boats, airplanes and the like. Therefore, the invention includes within its purview whatever changes fairly come within either the terms or the spirit of the appended claims.

Having described my invention, what I claim is:

1. A subterranean war machine comprising a body portion carrying weapons of offense, an engine therein, an auger-like head thereon shaped and dimensioned to excavate earth in a way to permit the passage of the machine therethrough, propelling wheels driven from said engine, means for driving the auger-like head from said engine, digger arms projecting laterally beyond the line of travel of the auger-like head, and means for imparting a clawing action to said digger arms from the engine.

2. A machine of the character described, comprising an elongated body, a caterpillar-type tractor upon which the rear end of said body is pivotally supported, said tractor comprising an engine for driving the treads thereof, ground wheels upon which the forward end of the body is supported, an auger-like head shaped and dimensioned to excavate earth to form a tunnel in which the body of the machine may enter, and manually operable means for changing the inclination of the body with respect to the line of travel of the tractor to thereby cause the machine to burrow either into or out of the ground.

3. A structure as recited in claim 2, in combination with digger arms projecting laterally beyond the sides of the machine, and means for imparting a clawing action to the digger arms.

4. A machine of the character described comprising an elongated body, a caterpillar tractor with respect to which the rear end of said body is pivotally connected, said tractor comprising an engine, a longitudinally extending drive shaft leading from the tractor to the forward end of the machine, an auger-like head mounted upon the forward end of said shaft, said auger-like head being shaped and dimensioned to excavate a tunnel into which the machine may enter, a clutch for controlling the action of the tractor from the engine, a second clutch for controlling the action of the shaft from the engine, the said clutches being manually controllable independently of each other, forward ground wheels, and manually operable means for supporting and raising or lowering the forward portion of the body from the forward ground wheels.

5. A structure as recited in claim 4, wherein the means for raising and lowering the body with respect to the forward ground wheels comprises a threaded rod, a bevel gear wheel engaged with said threaded rod, a bracket carried by the body and engaging the bevel gear wheel, a transverse shaft, and a bevel pinion upon said shaft meshing with the bevel gear wheel.

6. A structure as recited in claim 4, wherein the means for raising and lowering the body with respect to the forward ground wheels comprises a threaded rod, a bevel gear wheel engaged with said threaded rod, a bracket carried by the body and engaging the bevel gear wheel, a transverse shaft, a bevel pinion upon said shaft meshing with the bevel gear wheel, a worm wheel upon the transverse shaft, a worm engaging said worm wheel, and a manually operable crank for rotating the worm.

7. A machine of the character described, comprising an elongated armored body, an auger-like head at the forward end thereof dimensioned to excavate the earth for the passage of said body, a shaft by which said auger-like head is carried, cams upon said shaft, and digger arms operated by said cams, said cams being positioned and shaped to impart in and out and back and front movement to said digger arms in simulation of a clawing action.

8. A machine of the character described, comprising an elongated armored body, an auger-like head at the forward end thereof dimensioned to excavate the earth for the pasage of said body, a shaft by which said auger-like head is carried, cams upon said shaft, digger arms projecting laterally of the body and beyond the sides thereof and having pin and slot pivotal connection with said body, anti-friction members upon the inner ends of said arms engaged by grooves in said cams, said cams and grooves being eccentrically disposed with respect to the shaft, and said cams being mounted at an inclination upon said shaft to provide a pitch, the eccentric disposition of the grooves serving to impart an in and out movement to the digger arms, and the pitch of the cams serving to impart a back and front movement to the digger arms.

9. A machine of the character described comprising an elongated armored body, a drive shaft extending longitudinally therethrough, a tractor upon which the body is pivotally mounted, said tractor comprising an engine having a main shaft, a universal connection between the main shaft and the drive shaft, an auger-like head upon the forward end of the drive shaft, anti-friction bearings between the body and the auger-like head, and an annular apron carried by the head, the rear end of which snugly engages said body and houses said bearings and prevents the entry of dirt to the bearings.

10. A machine of the character described comprising an elongated body of armor plate, weapons of offense therein, a caterpillar tractor within the body comprising an engine, a large auger head at the forward end of the body, of such size as to excavate the ground for the passage of said body, a shaft by which said auger head is carried, said shaft extending through the body, a universal connection between the rear end of the shaft and the engine, a manually operable clutch for controlling said shaft from the engine, a manually operable clutch for controlling the delivery of power from the engine to the treads of the caterpillar tractor, a driver's seat, operating handles for said clutches adjacent the driver's seat, a pair of digger arms projecting laterally beyond the sides of the body adjacent the forward portion thereof, and cams mounted upon said shaft both eccentrically and with a pitch, said cams engaging the inner ends of said arms and imparting a clawing action thereto.

11. A machine of the character described comprising an elongated body, a caterpillar-type tractor upon which the rear end of said body is pivotally supported, said tractor comprising an engine for driving the treads thereof, ground wheels upon which the forward end of the body is supported, an auger-like head shaped and dimensioned to excavate earth to form a tunnel in which the body of the machine may enter, and means for changing the inclination of the body with respect to the line for travel of the tractor to thereby cause the machine to burrow either into or out of the ground.

GRATZ D. DUNKUM.